United States Patent
Ohno et al.

(10) Patent No.: US 7,043,358 B2
(45) Date of Patent: *May 9, 2006

(54) VEHICLE NAVIGATION SYSTEM ADAPTED TO IMPROVED SYSTEM UPGRADE PROCEDURE

(75) Inventors: Tsuneo Ohno, Saitama (JP); Yuuji Kameoka, Saitama (JP); Go Yuasa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 153 days.

This patent is subject to a terminal disclaimer.

(21) Appl. No.: 10/673,159

(22) Filed: Sep. 30, 2003

(65) Prior Publication Data

US 2004/0083051 A1 Apr. 29, 2004

(30) Foreign Application Priority Data

Oct. 29, 2002 (JP) .............................. 2002-314077

(51) Int. Cl.
*G01C 21/34* (2006.01)

(52) U.S. Cl. ...................... 701/208; 701/200; 717/168; 340/995.18

(58) Field of Classification Search ................ 717/169, 717/175; 340/995.18, 995.14; 710/7; 701/208
See application file for complete search history.

(56) References Cited

U.S. PATENT DOCUMENTS

| 5,515,284 | A | | 5/1996 | Abe |
| 5,544,087 | A | | 8/1996 | Nakajima et al. |
| 5,794,164 | A | | 8/1998 | Beckert et al. |
| 5,951,620 | A | | 9/1999 | Ahrens et al. |
| 6,018,695 | A | | 1/2000 | Ahrens et al. |
| 6,067,500 | A | * | 5/2000 | Morimoto et al. .......... 701/209 |
| 6,121,924 | A | * | 9/2000 | Meek et al. ............ 342/357.13 |
| 6,144,318 | A | * | 11/2000 | Hayashi et al. ......... 340/995.19 |
| 6,289,276 | B1 | | 9/2001 | Ahrens et al. |
| 6,292,626 | B1 | * | 9/2001 | Ino et al. ..................... 386/125 |
| 6,600,993 | B1 | | 7/2003 | Kaneko |
| 6,738,710 | B1 | * | 5/2004 | Nagaki ....................... 701/208 |
| 6,763,429 | B1 | * | 7/2004 | Hirayama ................... 711/112 |
| 2001/0004724 | A1 | * | 6/2001 | Nagaki ....................... 701/208 |

FOREIGN PATENT DOCUMENTS

| JP | 2000-251396 | 9/2000 | .................... 20/10 |
| JP | 2001-133273 | 5/2001 | |
| JP | 2001-165671 | * 6/2001 | |

* cited by examiner

Primary Examiner—Richard M. Camby
Assistant Examiner—Christine M. Behncke
(74) Attorney, Agent, or Firm—Arent Fox PLLC

(57) ABSTRACT

A vehicle navigation system is composed of first and second recording devices, first and second execution module, and an install module. The first and second recording devices respectively stores therein first and second computer programs used for vehicle navigation. The first and second execution module respectively executes the first and second computer programs. The install module transfers data stored in the second recording device, including the second computer program, to the first recording device. The install module is allowed to operate during operation of the second execution module, while the first execution module is prohibited from operating during operation of the second execution module.

8 Claims, 3 Drawing Sheets

VEHICLE NAVIGATION SYSTEM ADAPTED TO IMPROVED SYSTEM UPGRADE PROCEDURE

BACKGROUND OF THE INVENTION

1. Field of the Invention

The present invention is related to a vehicle navigation system, in particular, to a technique for upgrade of a vehicle navigation system.

2. Description of the Related Art

Vehicle navigation systems are provided with storage devices containing navigation software programs and map data.

A hard disk drive is a typical storage device used in a vehicle navigation system. A navigation system with a built-in hard disk drive uses a navigation program and map data stored in a hard disk drive to navigate a vehicle to a destination.

One of drawbacks of a navigation system with a built-in hard disk drive is that the navigation system can not work during upgrade. Upgrading a navigation system with a built-in hard disk drive involves detaching the hard disk drive, updating the navigation program and the map data within the hard disk drive, and restoring the hard disk drive to the system. Detaching the hard disk drive prohibits the navigation system from operating during the upgrade. This implies that a navigation system with a built-in hard disk drive is forced to quit navigating the vehicle during upgrade of the system. Furthermore, this upgrade procedure undesirably requires the user to hand over the vehicle to the dealer to have the hard disk drive updated.

Therefore, a need exists to provide a technique for effectively reducing duration when a navigation system is forced to quit operating in order to upgrade the system.

An optical disk drive, such as a DVD-ROM drive, is another a typical storage device used in a vehicle navigation system. A navigation system with a built-in DVD-ROM drive uses a navigation program and map data stored in a DVD-ROM to navigate a vehicle to a destination. Upgrading a navigation system with a built-in DVD-ROM drive can be achieved by replacing the DVD-ROM with a new DVD-ROM containing a new navigation program and new map data. Therefore, a navigation system with a built-in DVD-ROM drive is superior to that with a built-in hard disk drive in terms of necessary duration for upgrade of the system. Nevertheless, DVD-ROM drives are inferior to hard disk drives in terms of access time, and this undesirably leads to a slow operation speed of the system. Therefore, a navigation system desirably operates using a hard disk drive to improve operation speed.

Navigation systems provided with both a hard disk drive and a DVD-ROM drive are disclosed in Japanese Unexamined Patent Applications No. 2001-133273 and 2001-165671. The disclosed navigation systems transfer map data stored in a DVD-ROM to a hard disk drive, and executes vehicle navigation using transferred map data within the hard disk drive. These navigation systems allows users to play another DVD-ROM during vehicle navigation.

Japanese Unexamined Patent Application No. 2000-251396 discloses an in-vehicle information processing unit for achieving reliable data write into a hard disk drive.

SUMMARY OF THE INVENTION

An object of the present invention is to provide a vehicle navigation system for reducing time during which the system is forced to quit operation and the user is prohibited from using the system when upgrading the system.

Another object of the present invention is to provide a vehicle navigation system for achieve both improvement of an operation speed and reduction of the time during which the system is forced to quit operation when upgrading the system.

In an aspect of the present invention, a vehicle navigation system is composed of first and second recording devices, first and second execution modules, and an install module. The first and second recording devices respectively store therein first and second computer programs each of which is used for vehicle navigation. The first and second execution modules respectively execute the first and second computer programs. The install module transfers data stored in the second recording device, including the second computer program, to the first recording device. The install module is allowed to operate during operation of the second execution module, while the first execution module is prohibited from operating during operation of the second execution module.

The navigation system usually navigates a vehicle to the destination using the first computer program. This architecture allows the navigation system to execute vehicle navigation during update the first computer program to the second computer program, and effectively reduces duration when the system is forced to quit vehicle navigation.

Preferably, the first recording device has a read access time shorter than that of the second recording device. This effectively improves the operation speed of the navigation system compared to the system only having the second recording device.

The first recording device typically includes a hard disk drive, and the second recording device typically includes an optical disk drive, such as a DVD-ROM drive and a CD-ROM drive, which uses an easily detachable recording medium.

The install module preferably transfers the data from the second recording device to the first recording device in units of data blocks, each having a predetermined data size. In general, software for vehicle navigation has a large data size. Transfer of such software in units of the data blocks effectively reduces duration when the install module prohibits the operation of the second execution module, especially in the event that the file size of the software is quite large.

The navigation system advantageously includes a display management module adapted to display information on a data size of the data to be transferred to the first recording device on a display device. The display management module may display the data size itself or a ratio of the data size of the data to be transferred to data size of the whole of the data stored in the second recording device.

It would be also advantageous if the navigation system includes a display management module adapted to display a necessary duration for completing transfer of whole of the data to the first recording device on a display device.

In another aspect of the present invention, a method for upgrading a vehicle navigation system including an optical disk drive and a hard disk drive includes:

determining whether an optical disk storing an updated navigation program is mounted on the optical disk drive;

executing an original navigation program stored in the hard disk drive when the optical disk is not mounted;

executing the updated navigation program stored in the optical disk drive in response to the optical disk being mounted; and updating the navigation program through installing the updated navigation program into the hard disk drive during execution of the update navigation program.

DESCRIPTION OF THE PREFERRED EMBODIMENTS

Preferred embodiments of the present invention are described below in detail with reference to the attached drawings.

Figure 1:
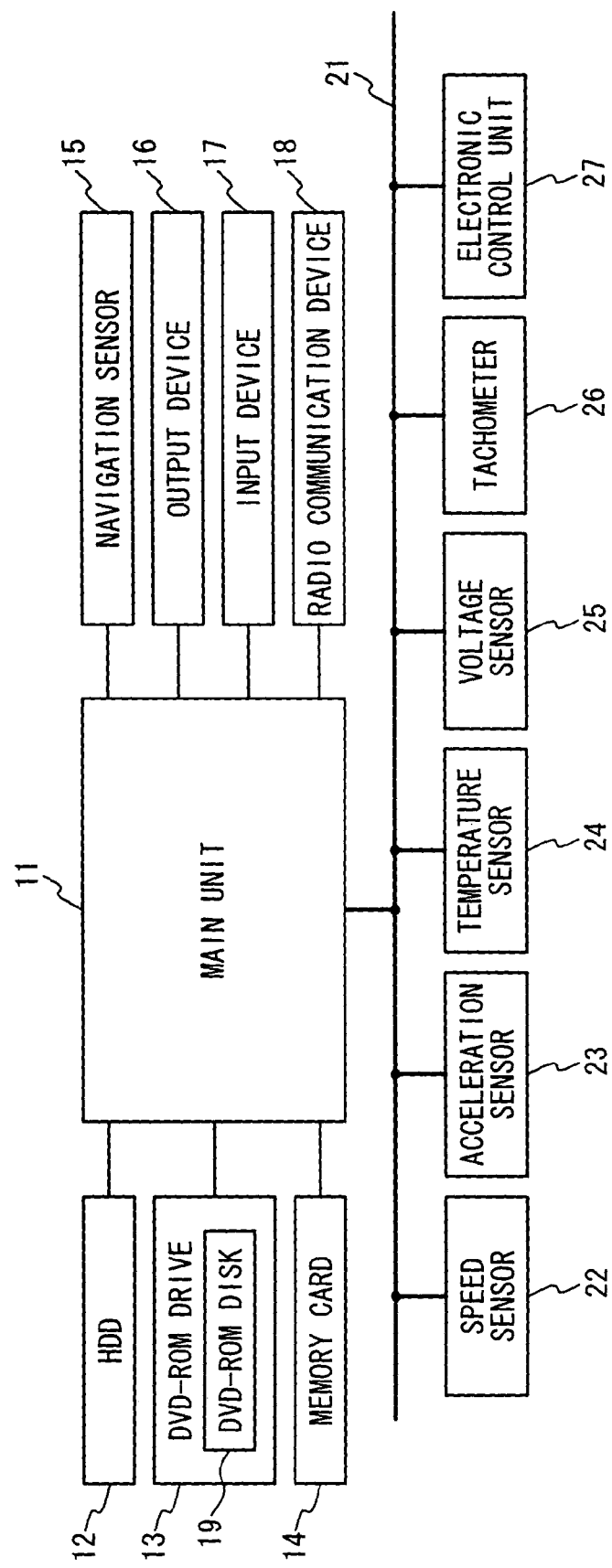
FIG. 1 is a block diagram of a navigation system in one embodiment of the present invention.

In one embodiment, as shown in FIG. 1, a navigation system 10 is composed of a main unit 11, a hard disk drive (HDD) 12, a DVD-ROM drive 13, a memory card 14, a navigation sensor 15, an output device 16, an input device 17, and a radio communication device 18. The navigation system 10 is mounted on a vehicle (not shown).

The main unit 11 is an information processing unit (or a computer) provided with a volatile memory device used for storage of software, and a central processing unit (CPU) for executing the software. The software includes a computer program and data used during execution of the computer program.

The hard disk drive 12 is a non-volatile storage device used for storing the software. The hard disk drive 12 is responsive to instructions from the main unit 11 for storing the software, and for outputting and deleting the software stored therein.

The DVD-ROM drive 13 reads out software from a DVD-ROM disk 19, and provides the software for the main unit 11.

The memory card 14 is used to store software, and responsive to instructions from the main unit 11 for storing software, and for outputting and deleting the software stored therein.

The navigation sensor 15 obtains data for determining the position of the vehicle. The navigation sensor 15 may include a GPS antenna and a gyroscope.

The output device 16 is used to provide various information generated by the main unit 11 for users, including drivers and fellow passengers. The output device 16 may include a liquid crystal display and a speaker.

The input device 17 is provided for operation of the users to input instructions into the main unit 11 of the navigation system. The input device 17 may include a microphone, a keyboard, and a touch panel.

The radio communication device 18 provides the main unit 11 with connections to the Internet through a cellular telecommunication network. The radio communication device 18 is designed to transfer information received from the main unit 11 to a terminal through the Internet, and to transfer information received from a server through the Internet to the main unit 11.

The main unit 11 is connected to a plurality of electronic control units (ECU) 27 and network sensors through an in-vehicle local area network 21. The ECUs 27 are used for controlling various apparatuses of the vehicle. The ECUs 27 may include an engine electronic control unit, a transmission electronic control unit, a power steering system electronic control unit, an ABS (antilock break system) electronic control unit, an air bag electronic control unit, an air conditioner electronic control unit, and a constant speed cruise electronic control unit. The network sensors includes a speed sensor 22, an acceleration sensor 23, a temperature sensor 24, a voltage sensor 25, and a tachometer 26. The speed sensor 22 determines the speed of the vehicle. The determined speed is provided for the transmission electronic control unit, the power steering system electronic control unit, the ABS electronic control unit, and the constant speed cruise electronic control unit. The acceleration sensor 23 determines the acceleration of the vehicle. The determined acceleration is provided for the air bag electronic control unit. The temperature sensor 24 determines the temperature in the vehicle. The determined temperature is provided for the air conditioner electronic control unit. The voltage sensor 25 determines the output voltage of a battery of the vehicle. The tachometer 26 determines the rotation speed of the engine of the vehicle. The determined rotation speed is provided for the engine electronic control unit.

Figure 2:
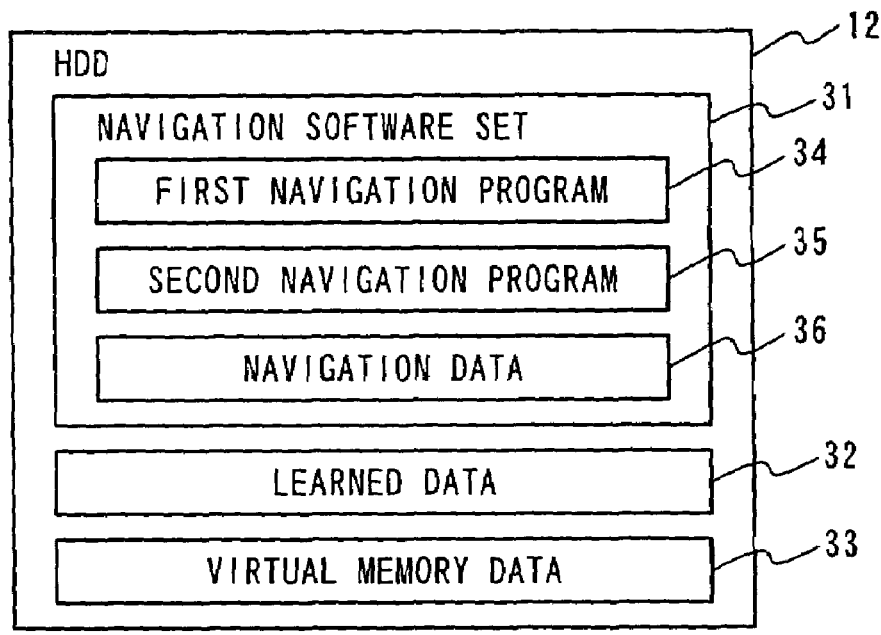
FIG. 2 is a block diagram schematically illustrating data stored in a hard disk drive.

FIG. 2 shows data stored in the hard disk drive 12. The data within the hard disk drive 12 is composed of a navigation software set 31, a learned data 32, and a virtual memory data 33. The navigation software set 31 is a set of computer programs and data used for vehicle navigation. The navigation software set 31 allows the navigation system 10 to measure the position of the vehicle, to specify the road along which the vehicle is travelling, to determine an optimum route along which the vehicle reaches the destination, and to inform the users of the optimum route. The learned data 32, which is generated by the navigation software set 31, includes data on the past destinations, user-specific data and other data. The virtual memory data 33 is used for a virtual memory technique. An operating system installed in the main unit 11 develops the virtual memory data 33 on the hard disk drive 12 to achieve a virtual memory operation.

The navigation software set 31 includes a first navigation program 34, a second navigation program 35, and navigation data 36. The first navigation program 34 is repeatedly or periodically executed. The first navigation program 34 includes a computer program designed to determine the position of the vehicle, to specify the road along which the vehicle is travelling, and to inform the users of the specified road with the output device 16. The second navigation program 35 is executed in response to occurrence of predetermined events. The second navigation program 35 includes a computer program designed to plan a route to a destination in response to input of the destination by the users, to replan the route to the destination in response to the vehicle getting out of the planned route, to provide the users with a guidance of the correct direction in response to the vehicle approaching an intersection, and to execute voice recognition of spoken instructions provided by a user to operate in accordance with the spoken instructions. The navigation data 36, which is used by the first and second navigation programs 34 and 35, includes map data representative of arrangement of roads. The map data is accompanied by information on the state of the roads, including asphalt-paved roads, dirt roads, and wavy paved roads. The navigation data 36 further includes data used for voice recognition, and data used for achieving a 3D display of the proposed route.

The DVD-ROM disk 19 is used for installing an updated version of the navigation software set 31. The updated version includes first and second navigation programs and navigation data, as is the case with the navigation software set 31. The first navigation program stored in the DVD-ROM disk 19 is an updated version of the first navigation program 34, which is repeatedly or periodically executed. The second navigation program stored in the DVD-ROM disk 19 is an updated version of the second navigation program 35, which is executed in response to the occurrence of the predetermined events. The navigation data stored in the DVD-ROM disk 19 is an updated version of the navigation data 36. The updated navigation data within the DVD-ROM disk 19 is adapted to the updated first and second navigation programs.

Figure 3:
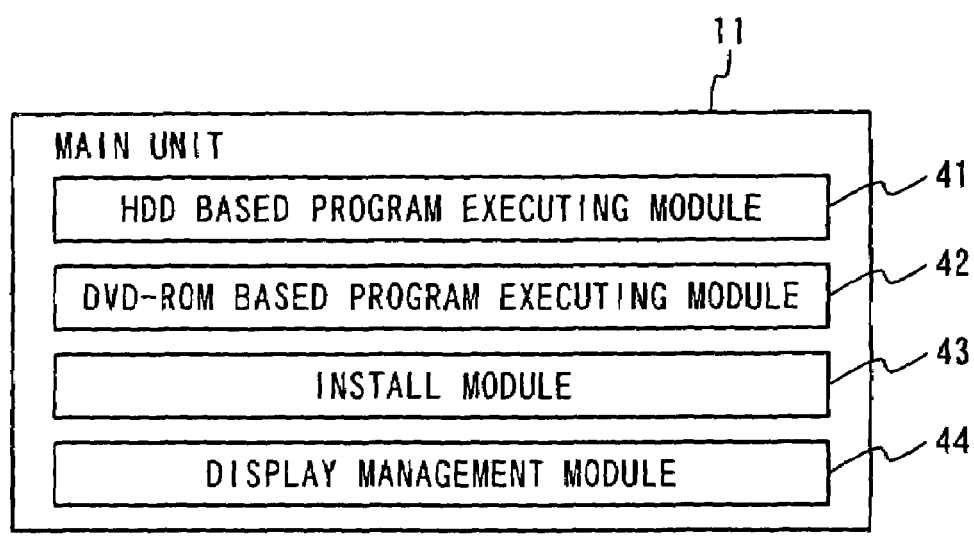
FIG. 3 is a block diagram of a main unit of the navigation system.

FIG. 3 shows details of the main unit 11 of the navigation system 10. The main unit 11 includes a HDD based program executing module 41, a DVD-ROM based program executing module 42, an install module 43, and a display management module 44. These modules are computer programs stored in a non-volatile memory disposed in the main unit 11. The HDD based program executing module 41 starts software programs stored in the hard disk drive 12. The DVD-ROM based program executing module 42 starts software programs stored in the DVD-ROM disk 19. The install module 43 transfers software stored in the DVD-ROM disk 19 to the hard disk drive 12 to update the software within the hard disk drive 12. The install module 43 is allowed to be executed during execution of the DVD-ROM based program executing module 42. The display management module 44 is used for providing users with various information on the update of the software. The display management module 44 calculates a current ratio of the data size of the already transferred portion of the software to the data size of the whole of the software to be transferred, and necessary time for completing the transfer of the remainder of the software. The display management module 44 depicts the calculated ratio and the calculated duration on a display device.

The operation of the navigation system 10 involves the navigation of the vehicle to the destination and the install of the updated software. The vehicle navigation is achieved by the navigation software set 31 stored in the hard disk drive 12, without using the DVD-ROM drive 13. During navigation on the basis of the hard disk drive 12, the users are allowed to mount an audio or video DVD-ROM disk on the DVD-ROM drive 13 to play the disk.

Figure 4:
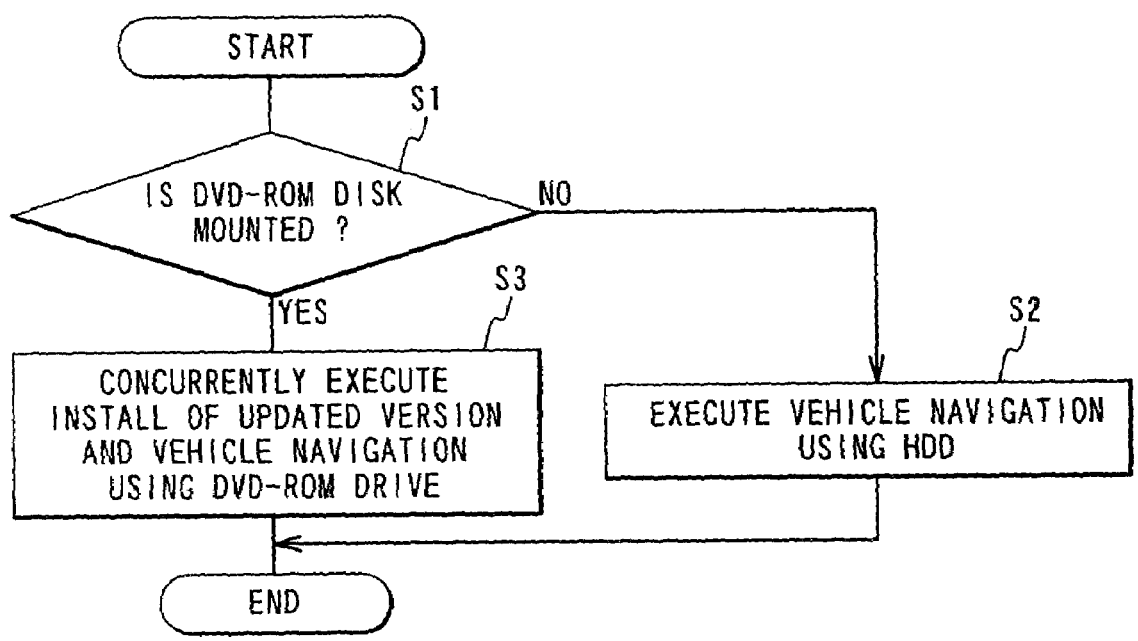
FIG. 4 is a flowchart illustrating a software install procedure in this embodiment.

FIG. 4 is a flowchart of the upgrade of the navigation system 10. To upgrade the navigation system 10, the user is requested to purchase a DVD-ROM 19 storing therein the updated version of the navigation software set 31. In response to the purchased DVD-ROM 19 being mounted on the DVD-ROM drive 13, at Step S1, the main unit 11 determines whether the install of the updated version is allowed. For example, the main unit 11 determines whether the user operates the navigation system 10 to start the install, and whether the DVD-ROM 19 storing the updated version is mounted on the DVD-ROM drive 13.

When the main unit 11 determines that the install of the updated version is not allowed at Step S1, the main unit 11 quits the install, and allows the HDD based program executing module 41 to start vehicle navigation using the navigation software set 31 within the hard disk drive 12 at Step S2.

Otherwise, the main unit 11 concurrently executes the install and the vehicle navigation at Step S3. The main unit 11 allows the install module 43 to transfer the updated navigation software set from the DVD-ROM disk 19 to the hard disk drive 12, while allowing the DVD-ROM based program executing module 42 to execute vehicle navigation using the updated navigation software set stored in the DVD-ROM disk 19. The main unit 11 transfers the updated navigation set during idle time of the vehicle navigation. The updated navigation set is desirably transferred in units of data blocks, each having a predetermined data size. The data block may consists of a plurality of sectors of the DVD-ROM disk 19. In an alternative embodiment, the main unit 11 may execute the install and the vehicle navigation through time-shared operations. After the completion of the install of the updated version, the main unit 11 starts vehicle navigation using the updated navigation software set stored in the hard disk drive 12.

This install procedure effectively reduces the time during which the navigation system 10 is forced to quit vehicle navigation when upgrading the system. Conventionally, an upgrade of a navigation system with a built-in hard disk drive involves detaching the hard disk drive and installing updated software into the detached hard disk drive; otherwise the upgrade of the navigation system involves quitting vehicle navigation and installing the updated software into the hard disk drive through the DVD-ROM drive. This results in that the conventional navigation system suffers from a drawback that the conventional navigation system can not execute vehicle navigation during the upgrade the system. The navigation system 10 concurrently executes the vehicle navigation on the basis of the updated version of the software set stored in the DVD-ROM disk during the install of the updated version. This effectively reduces the time during which the navigation system 10 is forced to quit vehicle navigation when upgrading of the system.

In addition, the navigation system 10 is superior in the operation speed. As mentioned above, the navigation system 10 uses the navigation software set stored the hard disk drive 12 during normal operations. The fast access speed of the hard disk drive 12 effectively improves the operation speed of the navigation system 10.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. A vehicle navigation system comprising:

first and second recording devices storing therein first and second computer programs, respectively, wherein said first and second computer programs are used for vehicle navigation;

a first execution module executing said first computer program;

a second execution module executing said second computer program;

an install module transferring data stored in said second recording device to said first recording device, wherein said install module operates concurrently with vehicle navigation operation achieved by said second computer program being executed by said second execution module, wherein said first execution module is prohibited from operating during operation of said second execution module.

2. The vehicle navigation system according to claim 1, wherein a read access time of said first recording device is shorter than that of said second recording device.

3. The vehicle navigation system according to claim 2, wherein said first recording device includes a hard disk drive, and said second recording device includes an optical disk drive.

4. The vehicle navigation system according to claim 3, wherein said optical disk drive is a DVD-ROM drive.

5. The vehicle navigation system according to claim 1, wherein said install module transfers said data in units of data blocks, each having a predetermined data size.

6. The vehicle navigation system according to claim 5, further comprising a display management module adapted to display a data size of data to be transferred to said first recording device on a display device.

7. The vehicle navigation system according to claim 5, further comprising a display management module adapted to display a necessary duration for completing transfer of a remainder of said data to said first recording device on a display device.

8. A method for upgrading a vehicle navigation system including an optical disk drive and a hard disk drive, said method comprising:

determining whether an optical disk storing an updated navigation program is mounted on said optical disk drive;

executing an original navigation program stored in said hard disk drive when said optical disk is not mounted;

executing said update navigation program stored in said optical disk drive in response to said optical disk being mounted;

and updating said navigation program through installing said updated navigation program into said hard disk drive during execution of vehicle navigation operation based on said update navigation program.

* * * * *